United States Patent Office 3,379,862
Patented Apr. 23, 1968

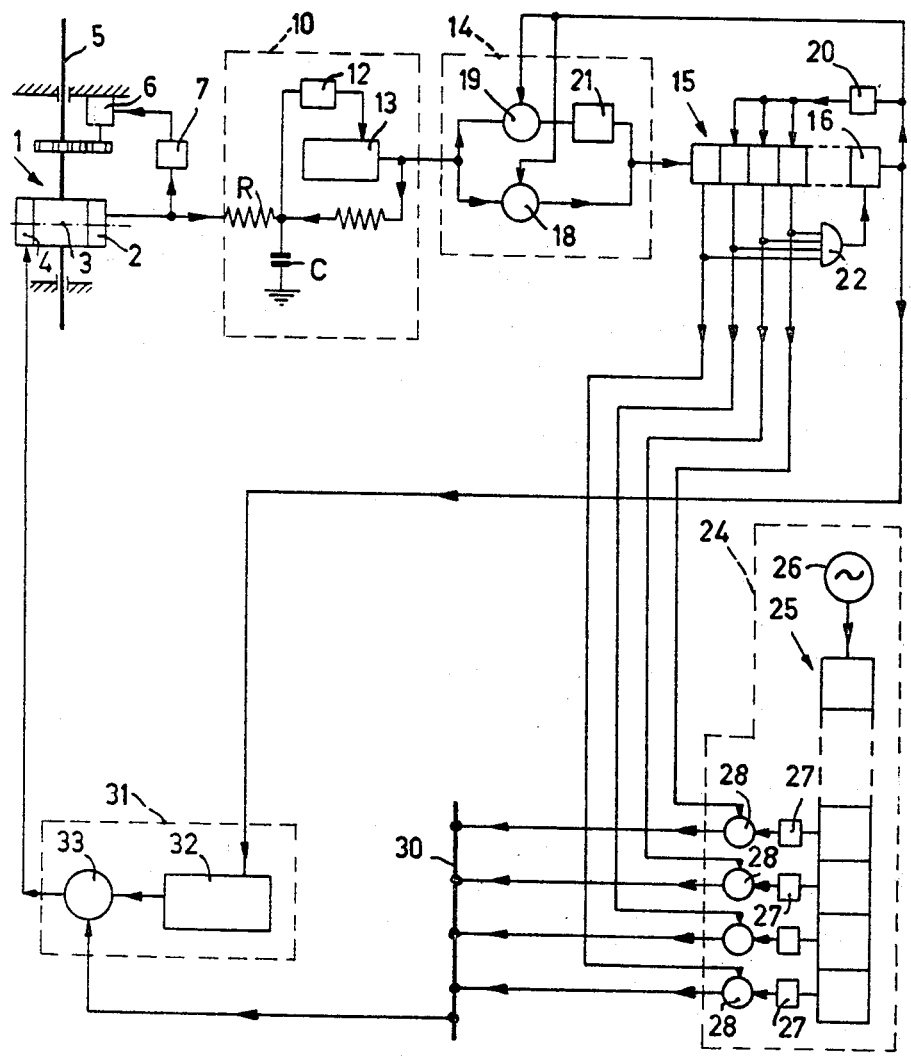

3,379,862
DEVICE FOR INDICATING THE ANGULAR
VELOCITY OF A SYSTEM
Nils Folke Hector, Solna, Sweden, assignor to North
American Philips Company, Inc., New York, N.Y.,
a corporation of Delaware
Filed Oct. 28, 1964, Ser. No. 407,041
Claims priority, application Sweden, Oct. 30, 1963,
11,958/63
12 Claims. (Cl. 235—92)

ABSTRACT OF THE DISCLOSURE

An inertial navigation system having provision for digital output of integrated acceleration signals is provided with a gyroscope having an input axis and an output axis. A signal generator responds to output axis deviations in accordance with acceleration about the input axis to produce an electrical magnitude. The magnitude is converted to an integrated pulse series having a frequency proportional to the signal magnitude. The pulses are accumulated in a multistage counter with provision within the counter for indicating which direction the stored count represents in terms of gyroscopic acceleration. A digital to analog conversion device connected to the counter continuously provides an analog magnitude of the stored count. The analog magnitude is fed to the torque generator of the gyroscope for producing a torque countering the displacement of the output axis to restore equilibrium.

---

The present invention relates to gyroscopic devices and particulary to a device for indicating the angular velocity of a system by means of a gyroscope arranged for acceleration and having a feed back loop comprising an integration device from the gyroscope signal generator to the gyroscope torque generator so that a torque counteracting the movement around the output axis and proportional to the integral of the output voltage of the signal generator with time is fed back, and in which the output information is available in digital shape. Such a device may for example be used in inertial navigation systems for achieving a reference direction required to sense the angular movement of a body in a space fixed coordinate system. If, for example, the gyroscope connected for acceleration and included in the angular velocity indicating device is rotatably mounted in a support so that it can rotate relative to the support around the input axis or sensing axis of the gyroscope, and a signal is fed back from the signal generator of the gyroscope to a torque generator arranged at the rotating shaft of the gyroscope, the torque generator acting upon the gyroscope with a torque proportional to the output voltage of the signal generator for rotating the gyroscope about its input axis in such direction that the signal generator voltage is regulated to zero, the rotatably mounted system will have an artificially increased moment of inertia as described in Swedish Patent 189,939. Furthermore, if the rotatably mounted system including the gyroscope is formed as a pendulum i.e. with a small unbalance in relation to its rotation axis, the system can by suitable choice of the circuit constants be imparted an oscillation time (approximately 84 minutes) such that the system will be Schuler-tuned, which means that it will indicate the true vertical independently of accelerations of the pendulum axis. This pendulum will respond to movements over the earth surface with a rotation movement of exactly the same angular velocity as the angular velocity of the movement relative to the center of earth and the output information from the angular velocity sensing device will represent the linear velocity over the surface of earth.

In known devices comprising a gyroscope in acceleration connection the whole feed back loop with integration device is composed by components working with analogous magnitudes. If it is required to match such a device to a digital computer it is consequently necessary to derive a suitable analogous voltage, for example the voltage after the integration, and convert this voltage to digital form, the accuracy in the output information being dependent upon this analogous-digital conversion. If the device is for example included in an inertial navigation system and shaped as a Schuler-tuned pendulum, in which case the voltage after integration represents the velocity across the surface of earth, an error in the analogous-digital conversion will give rise to an error in the position indication, which increases with time.

The object of the invention is to produce a device in which the integration in the feed back loop of the acceleration connected gyroscope is made with higher accuracy than in known devices and in which a check of the digital output information is produced.

According to the invention this is achieved in that the device comprises a pulse converter connected to the signal generator and adapted to convert the output voltage of the signal generator to a pulse series having a pulse frequency which is proportional to the voltage of the signal generator, a pulse counter for counting and storing the number of produced pulses, and a device interconnecting the pulse counter and the torque generator for producing a control voltage for the torque generator, which is proportional to the number stored in the counter, the angular velocity of the system in respect of rotation about the input axis or sensing axis of the gyroscope being registered in digital form in the counter.

By effecting the digitalizing procedure within the closed loop regulation circuit, with a subsequent conversion back to analogous voltages after the integration, the essential advantage is achieved that the accuracy of the digital output information is increased. This depends upon the fact that the said closed loop including the digitalizing step is a zero system. Thus, if an error should appear in the digitalizing procedure, this error will automatically be regulated to zero in the closed loop regulation circuit. The accuracy of the digital output information from the device according to the invention will, however, be dependent upon the accuracy of the re-conversion from digital to analogous magnitudes, which conversion, however, can be effected with extremely high accuracy. A further advantage of the device according to the invention lies in effecting the digitalizing step before integration, and thus intergration can be made with very high accuracy simply by counting pulses.

The invention is now explained more fully in connection with the accompanying drawing which illustrates in a simplified block diagram a gyroscope arranged in acceleration connection with digital integration in the feed back loop of the gyroscope, which gyroscope is used for imparting a rotatably mounted system, an artificially increased moment of inertia (for indicating the true vertical, for example in an inertial navigation system).

In FIG. 1 reference numeral 1 designates a single axis viscous damped gyroscope without restraint, usually called an integrating gyroscope. The gyroscope is provided with a signal generator 2 working about the output axis 3 of the gyroscope and producing a signal which is proportional to the deviation of the gyroscope rotor from a zero or reference position. The gyroscope is furthermore provided with a torque generator 4 operating about the same axis 3 and influencing the rotor of the gyroscope with a torque proportional to the applied control voltage. The gyroscope is mounted in a support such that it is rotatable relative to the said support about the input axis or sensing axis 5 of the gyroscope, the rotational movement about the input axis being controlled by a servo motor 6 mounted upon the support.

A feed back loop described more fully in the following is arranged from the signal generator 2 of the gyroscope to the torque generator 4 of the same, which feed back loop comprises an integration device so that the voltage fed back to the torque generator and thus the produced torque is proportional to the integral of the output voltage of the signal generator with respect to time. The torque acts in such direction that a deviation about the output axis is counteracted by the torque. A gyroscope having a feed back loop of this kind is generally said to be arranged in acceleration connection because an output voltage from the signal generator will be proportional to the angular acceleration about the input axis. The voltage from the signal generator 2 is also fed back after amplification in an amplifier 7 to the servo motor 6 acting upon the gyroscope, the connection being such that an output voltage from the signal generator 2 causes a rotation of the gyroscope about its input axis such that the output voltage of the signal generator is regulated to zero.

It can be shown that such an arrangement results in an artificially increased moment of inertia of the system rotatably mounted about the axis 5, the total moment of inertia of the said system being equal to the sum of the natural moment of inertia of the said system and the artificial moment of inertia. The artificial moment of inertia can be made of any required value by suitable choice of the circuit constants in the two feed back loops.

In an embodiment described as in example for illustrating the inventional idea the gyroscope 1 is assumed to be mounted with the output axis vertical and both the input axis and the spin axis in a horizontal plane. The rotatably mounted system is furthermore assumed to have a small unbalance about axis 5 so that it forms a pendulum. As this pendulum has its pendulum axis 5 horizontally arranged, the pendulum will be sensitive to accelerations in the horizontal plane. The unbalance is dimensioned relative to the resulting moment of inertia of the system so that the whole system is Schuler-tuned (an oscillation time of approximately 84 minutes) which means that the pendulum will indicate the true vertical independently of linear acceleration of the pendulum axis. Two such Schuler-tuned pendulums are mounted in mutual perpendicular positions in a common platform which is controlled from the said pendulums such that it always assumes a predetermined angular position relative to each pendulum. Such a device is indicating the true vertical and can be used for navigational purposes. For producing a functional device the platform must also be provided with a coarse indicating gyroscope having a vertical input axis, which gyroscope is controlled such that the platform is maintained fixed relative to earth co-ordinates, for example with one pendulum axis coincident with the local meridian tangent direction and the other pendulum axis coincident with the local parallel circle tangent direction. Only one of the pendulums used in this true vertical indicating device ic considered in the following.

The feed back loop between the gyroscope output of the signal generator and the input of the gyroscope torque generator comprises a pulse converter 10 for converting the output voltage of the signal generator to a voltage-time limited pulse series having a pulse frequency which is proportional to the amplitude of the output voltage of the signal generator. The pulse converter 10 may for example, as in the shown embodiment, consist of the series combination of a resistance R and a capacitor C with the resistance connected to the signal generator so that the capacitor is charged from the signal generator with a charging speed which is dependent upon the voltage appearing at the output of the signal generator. The voltage of capacitor C is sensed by a device 12, which triggers a triggering device or pulse generator 13 as soon as the capacitor voltage has reached a predetermined small threshold value. The output pulse series is voltage-time limited because for each triggering of the pulse generator 13 this generator produces a voltage pulse having a predetermined voltage-time content which pulse is fed back to the capacitor C through a resistance. The device 12, 13 is sensitive to the polarity of the voltage of the capacitor so that a negative pulse is produced by 13 when the voltage of the capacitor is positive and vice versa. Each pulse from 13 therefore brings about discharging of the capacitor. The voltage-time content of the pulses from pulse generator 13 is chosen such that the capacitor is discharged to approximately zero voltage for each pulse.

The device 12 may in a suitable embodiment consist of a high gain chopper DC-amplifier and the device 13 may then consist of two monostable flip-flops with associated gating circuits. The two flip-flops are in this embodiment adjusted to operate upon the same threshold input voltage but are sensitive to different input voltage polarities so that one flip-flop operates for producing a voltage pulse of one polarity when the input voltage reaches the positive threshold value and the second flip-flop operates to produce a voltage pulse of opposite polarity when the input voltage reaches the negative threshold value.

It is to be understood that if the pulses from pulse generator 13 deviates from the predetermined voltage-time content—for example are less than this value—then a greater number of pulses are required for discharging the capacitor and vice versa. Thus the value of the said voltage-time content is determining the proportionality constant between the pulse frequency and the input voltage derived from the signal generator of the gyroscope. Inversely it can be said that if there is required proportionality between the pulse frequency and the input voltage from the signal generator then the said voltage-time content also must be maintained at a constant value for all pulses. For maintaining the voltage-time content at the desired value with higher accuracy than is possible in the described example a high stable oscillator can be used for determining the front and back flanks and the pulses and cooperating with a normal voltage source, as a Zener diode or a normal cell for determining the amplitude.

The pulse produced by the pulse generator 13 are fed through a gate unit 14 to a forward-backward binary pulse counter 15 which registers the absolute value of the difference between the applied positive and negative pulses. Furthermore the last stage 16 of the counter 15 indicates if either the positive or negative pulses are in pre-dominance. As the pulse frequency of the pulse series from the pulse generator 13 is proportional to the voltage at the output of the signal generator of the gyroscope the number stored in counter 15 will correspond to the integral with time of the said voltage.

The construction and function of gate unit 14 and counter 15 will be explained in connection with the given example with two Schuler-tuned pendulums used to control a true vertical indicating platform which is assumed to be situated in an aeroplane or the like. The pendulums are identical and the function will be described in respect of one of the pendulums only. In this example with a gyroscope of acceleration connection used as a Schuler-tuned pendulum a voltage at the output of the signal generator corresponds to a linear acceleration of the aeroplane in the sensing direction of the pendulum and the number stored in binary form in counter 15 will therefore be a measure of the instantaneous velocity of the aeroplane in the actual direction.

Assume that the aeroplane is initially at rest and the number stored in counter 15 is 0, i.e. all stages in a position designated 0. Also the last polarity indicating stage 16 of counter 15 is in the position 0 and keeps a first input gate 18 open and a second input gate 19 closed. Now, if the aeroplane starts with a certain acceleration in the sensing direction of the Schuler pendulum, an output voltage of a certain polarity is derived from the signal generator and, for example, positive pulses derived from the output of pulse generator 13. These pulses are led through AND-gate 18 to counter 15 which is operated in the forward direction. At the end of the acceleration period the voltage at the output of the signal generator disappears and thus also the pulse series from the pulse generator 13, whereby the counter 15 stops in the reached state. The number stored in counter 15 is a measure of the instantaneous velocity in the actual direction.

Assume that the aeroplane is now retarding to the velocity 0. Retardation will give rise to a voltage of the opposite polarity at the output of the signal generator and consequently pulses of the opposite polarity will appear at the output of pulse generator 13. These negative pulses are fed through AND-gate 18 to the forward-backward counter 15 which is now driven in backward direction. When the velocity of the aeroplane has decreased to 0 the counter has received equal number of positive and negative pulses and the stored number is equal to 0.

Now, assume that the aeroplane starts in the opposite direction so that negative pulses continue to be produced at the output of pulse generator 13. The first negative pulse then passes to counter 15 through gate 18 and switches all the stages in the counter to position 1. Also the last stage 16 changes its state to position 1 and then returns all the foregoing stages except the first one to position 0 by means of a differentiating device 20. The last stage 16 also acts upon the input gates so that input gate 18 is closed and input gate 19 is opened. The following negative pulses are now fed through gate 19 and an inverter device 21 to the forward-backward counter. The inverting action in device 21 results in that positive pulses reach the counter and the counter consequently will be operated in forward direction but the 1-condition of last stage 16 indicates that the counter is storing negative pulses.

In order not to lose the sign at zero passage in the opposite direction, i.e. when the number 1 is stored in the last stage 16, there is a coincidence device 22 having inputs connected to all stages of counter 15 except the last one for zeroing this last stage 16 when all the foregoing stages are in position 0. The velocity information stored in counter 15 may for example be read by sensing the condition of each stage of the counter and then applied to a digital computer for evaluation.

As mentioned it is required for achieving a gyroscope in acceleration connection that a control voltage is fed back to the linear torque generator. The control voltage is proportional to the integral with time of the output voltage of the signal generator. But according to the foregoing the number stored in the counter 15 is equal to the integral with time of the output voltage of the signal generator. The number stored in binary shape in counter 15 is consequently to be converted to a magnitude which is proportional to this number and which is suitable as input magnitude to the torque generator i.e. in principle an analogous voltage. This digital-analogous conversion is achieved by means of a so-called binary pulse generator 24 with means for ensuring that the pulses from the said generator are given an accurately determined voltage-time content before they reach the torque generator.

The binary pulse generator consists of a binary pulse counter 25 working continuously upon pulses derived from a high stable oscillator 26. The individual stages of the binary counter 25 are associated with differentiating means 27 for deriving a pulse each time the respective stage is switched in opposite direction as compared with the switching direction that causes switching of the following stage of the counter. The pulse series produced in this way are shaped such that the pulse frequency in a pulse series is always equal to half the pulse frequency of the pulse series received from the foregoing stage in the counter and furthermore such that no pulse in any pulse series coincides in time with any pulse in any other pulse series. The pulses from counter 25 are led to gates 28 which are controlled in dependence of the individual stages of the forward-backward pulse counter 15 so that respective gate is open when the associated stage in counter 15 is in position 1 and closed when the stage is in position 0. The interconnection between counter 15 and pulse generator 24 is such that the first stage of counter 15 controls the gate associated with the last stage of pulse counter 25, the second stage of counter 15 controls the gate associated with the second last stage of pulse counter 25 etc.

The outputs of the gates are connected to a common output lead 30 on which there will appear a resulting pulse series containing all pulses in the pulse series selected by actuation of the associated gates in the binary pulse generator. The mean frequency of the resulting pulse series will be directly proportional to the number stored in the forward-backward counter 15, the proportionality constant being dependent upon the operation speed of the continuously working counter 25.

The resulting pulse series is fed to a pulse shaping device 31 which for each applied pulse produces a rectangular pulse having an accurately determined voltage-time content, which rectangular pulses in turn are fed to the torque generator of the gyroscope. The pulse shaping device 31 consists in the shown example of a pulse generator 32 producing pulses of the predetermined voltage-time content continuously at its output and on AND-gate 33 controlled from the said common output lead 30 for passing a rectangular pulse from the pulse generator 32 to the torque generator of the gyroscope for each pulse appearing upon the lead 30. The pulses appearing on lead 30 have a very short duration and can furthermore appear in different time moments relative to the pulses produced by pulse generator 32. Means must therefore be provided for ensuring that the gate 33 in spite of this irregularity will pass exactly one pulse from generator 32 for each pulse received from pulse generator 24. This can be achieved by means of a memory circuit, for example in the shape of a flip-flop circuit, arranged at the control input of gate 33. The pulses from binary gate generator 24 are then led to his memory circuit which for each received pulse opens the gate and holds it open until a whole pulse from generator 32 has passed the gate. After the passage of a pulse the said memory circuit is automatically reset to its initial position and then also returns the gate 33 to closed condition. The said memory circuit may consist of a monostable flip-flop circuit with a suitable time constant. For preventing that fractional pulses are transmitted a connection also leads from the pulse generator 32 to the memory circuit in order to prevent that the memory circuit opens the gate 33 during a pulse interval. The pulse generator 32, for example operating such that the front and back flanks of the pulses are accurately determined by means of a high stable oscillator, for example oscillator 26, while the amplitude is determined by means of a normal voltage source, as a normal cell or a Zener diode, is furthermore controlled from the last stage 16 of the forward-backward pulse counter 15 so that the pulses produced by pulse generator 32 change polarity when the last stage of counter 15 changes position, i.e. when the stored number representing the integral of the output voltage of the signal generator changes polarity.

Determining for the accuracy of the device is the accuracy with which the said voltage-time content of the pulses generated by the pulse generator 32 can be maintained, as a deviation from this predetermined value results in a deviation between the digital output information from the counter 15 and the corresponding analogous magnitude which is really fed back to the torque generator. The resolution of the digital-analogous conversion can be made of any required value by increasing the frequency of the oscillator.

A number of modifications of the described device are possible within the scope of the invention. Thus the forward-backward pulse counter 15 may be replaced by two counters, one for the positive pulses from pulse converter 10 and one for the negative pulses. The gates of the binary pulse generator 24 and the pulse shaping device 31 may then be controlled directly from the individual stages of these two counters such that the associated pulse series is passed to the torque generator if corresponding stages in the two counters are in different positions, the polarity of the produced pulses being dependent upon which one of the counters that has the actual stage in position 1, while the pulse series is inhibited if both stages are in the same position. Alternatively the associated pulse series can be passed whenever a stage in respective counter is in the position 1, the pulses resulting from the different counters having different polarity. According to another embidment it is possible to use a further counter which registers the difference between the numbers stored in the two counters, the gates of the binary pulse generator being controlled from this difference counter in the same way as shown in the described example. The pulse generator of the pulse converter 10 can be the same pulse generator 32 as that included in the pulse shaping device 31. Instead of using a continuously operating pulse generator 32 it is also possible to trigger the pulse generator for producing a rectangular pulse having an accurately determined voltage-time content for each pulse received from the binary pulse generator. Instead of deriving the control voltage for the torque generator 6 directly from the signal generator of the gyroscope it is also possible to derive this control voltage from the output of the pulse converter 10 as the mean value over a certain time interval of the pulses appearing at the output of the said converter will be proportional to the voltage of the signal generator 2.

What is claimed is:

1. An inertial navigation system comprising, a gyroscope having angular motion about an output axis in response to angular acceleration about an input axis perpendicular to said output axis, said gyroscope including a signal generator for generating a first signal having a magnitude indicative of angular motion and a torque generator for applying a torque to said input axis in opposition to said angular motion about said output axis in response to a torque signal applied thereto, first pulse conversion means connected to said signal generator for providing a voltage-time limited pulse series having a frequency proportional to the magnitude of said first signal, counting means coupled to said pulse conversion means and responsive to each pulse of said pulse series for storing therein a digital count representative of the integrated value of said first signal with respect to time, second pulse conversion means coupled to said counting means and responsive to said digital count for providing a second signal having a magnitude corresponding to said digital count, and means connecting said second pulse conversion means to said torque generator for applying said second signal thereto as said torque signal.

2. The combination of claim 1 wherein said counting means is coupled to said first pulse conversion means by a gating device said device comprising, for increasing acceleration about said input axis in a first direction, a normally open gate passing pulses from said first pulse conversion means to said counting means, a normally closed gate blocking pulses applied thereto connected in series with an inverter, said series combination being connected in parallel with said normally open gate, and direction sensitive means responsive to increasing acceleration about said input axis in a second and opposite direction for reversing the conditions of said normally open and said normally closed gates.

3. The combination of claim 1 wherein said first pulse conversion means includes a capacitor, means for charging said capacitor in accordance with the magnitude level of said first signal, means responsive to the charge level of said capacitor for repeatedly feeding back to said capacitor a fixed duration pulse having a polarity opposing said charge polarity for substantially discharging said capacitor until said charge level is dissipated.

4. The combination of claim 1 wherin said counting means comprises a series connected chain of binary digital stages, gating means applying a first series of pulses of a first polarity from said pulse converter to said counting means indicative of increasing acceleration about said input axis in a first direction, said counting means including an auxiliary stage connected serially with the said chain of stages, said auxiliary stage responsive to a first pulse of a second series of pulses of a second polarity appearing from said gating means indicative of increasing acceleration about said input axis in a second direction for assuming a binary condition indicative thereof, and means coupling said auxiliary stage to said gating means for inverting the polarity of the remainder of said second series of pulses, said auxiliary stage indicating the direction of said second direction acceleration to distinguish the stored count in said counting means from said first direction acceleration.

5. The combination of claims 4 wherein said second pulse conversion means includes means responsive to the condition of said auxiliary stage for providing a correcting torque signal to said torque generator of a polarity corresponding to that of the acceleration direction.

6. The combination of claim 4 wherein said second pulse conversion means comprises an oscillator, a series connected chain of bistable counting stages connected to said oscillator and responsive thereto for producing a continuous series of pulses, a plurality of coincident gating means, each respective one of said coincident gating means having one input coupled to a respective one of said bistable counting stages, another input coupled to a respective one of said bistable digital stages and an output connected to a point in common with all the outputs of each of said coincident gating means, the means frequency of the pulse series appearing at said common point being proportional to the count stored in said counting means, means for producing a continuous series of pulses, and further coincident gating means responsive to signals produced at said common output point for passing said continuous series of pulses to said torque generator.

7. An inertial navigation system comprising, a gyroscope having angular motion about an output axis in response to angular acceleration about an input axis perpendicular to said output axis, said gyroscope including a signal generator responsive to said angular motion of said output axis for generating a first signal magnitude having a first polarity in response to increasing angular acceleration about said input axis and a second polarity in response to decreasing angular acceleration about said input axis, and a torque generator operating in response to a torque signal applied thereto for applying a torque to said input axis in opposition to said angular acceleration sufficient to counter said output axis angular motion, first pulse conversion means connected to said signal generator for providing a voltage-time limited pulse series having a frequency proportional to the magnitude of said first signal and a polarity corresponding to the polarity of said first signal, a forward-backward digital counting means coupled to said first pulse conversion means and responsive to the polarity and numerical content of said pulse series for producing therein a stored count digital signal representative of the angular velocity about said gyroscope input axis, a pulse of said first polarity effecting an increase in said stored count, a pulse of said second polarity effecting a decrease in said stored count, second pulse conversion means coupled to said digital counting means and responsive to said stored count for providing a second signal having a magnitude substantially continuously corresponding to said stored count, and means connecting said second pulse conversion means to said torque generator for applying said second signal thereto, said second signal providing said torque signal.

8. The combination of claim 7 wherein said counting means is coupled to said first pulse conversion means by a gating device, said device comprising, for increasing acceleration about said input axis in a first direction, a normally open gate passing pulses from said first pulse conversion means to said counting means, a normally closed gate blocking pulses applied thereto connected in series with an inverter, said series combination being connected in parallel with said normally open gate, and direction sensitive means responsive to increasing acceleration about said input axis in a second and opposite direction for reversing the conditions of said normally open and said normally closed gates.

9. The combination of claim 7 wherein said first pulse conversion means includes a capacitor, means for charging said capacitor in accordance with the magnitude level of said first signal, means responsive to the charge level of said capacitor for repeatedly feeding back to said capacitor a fixed duration pulse having a polarity opposing said charge polarity for substantially discharging said capacitor until said charge level is dissipated.

10. The combination of claim 7 wherein said counting means comprises a series connected chain of binary digital stages, gating means applying a first series of pulses of a first polarity from said pulse converter to said counting means indicative of increasing acceleration about said input axis in a first direction, said counting means including an auxiliary stage connected serially with the said chain of stages, said auxiliary stage responsive to a first pulse of a second series of pulses of a second polarity appearing from said gating means indicative of increasing acceleration about said input axis in a second direction for assuming a binary condition indicative thereof, and means coupling said auxiliary stage to said gating means for inverting the polarity of the remainder of said second series of pulses, said auxiliary state indicating the direction of said second direction acceleration to distinguish the stored count in said counting means from said first direction acceleration.

11. The combination of claim 10 wherein said second pulse conversion means includes means responsive to the condition of said auxiliary stage for providing a correcting torque signal to said torque generator of a polarity corresponding to that of the acceleration direction.

12. The combination of claim 10 wherein said second pulse conversion means comprises an oscillator, a series connected chain of bistable counting stages connected to said oscillator and responsive thereto for producing a continuous series of pulses, a plurality of coincident gating means, each respective one of said coincident gating means having one input coupled to a respective one of said bistable counting stages, another input coupled to a respective one of said bistable digital stages and an output connected to a point in common with all the outputs of each of said coincident gating means, the means frequency of the pulse series appearing at said common point being proportional to the count stored in said counting means, means for producing a continuous series of pulses, and further coincident gating means responsive to signals produced at said common output point for passing said continuous series of pulses to said torque generator.

References Cited

UNITED STATES PATENTS

| 3,219,803 | 11/1965 | Jones | 235—92 |
| 3,222,795 | 12/1965 | Gevas | 235—150.25 X |
| 3,237,313 | 3/1966 | Gevas | 33—226 |

MAYNARD R. WILBUR, *Primary Examiner.*

DARYL W. COOK, *Examiner.*

G. J. MAIER, *Assistant Examiner.*